April 26, 1949. C. M. HAMMEL 2,468,703
CHRONOMETRIC ELECTRONIC RADIOSONDE SYSTEM
Filed Sept. 26, 1946 8 Sheets-Sheet 1

INVENTOR.
Clifford M. Hammel
BY Kenway & Witter
Attys.

April 26, 1949.　　　　C. M. HAMMEL　　　　2,468,703
CHRONOMETRIC ELECTRONIC RADIOSONDE SYSTEM
Filed Sept. 26, 1946　　　　　　　　　　8 Sheets-Sheet 5
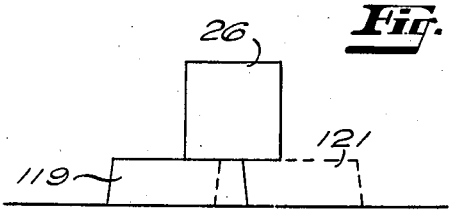
*Fig. 5*
SIGNAL PROPERLY AND EVENLY SPACED WITH RESPECT TO THE TWO GATES
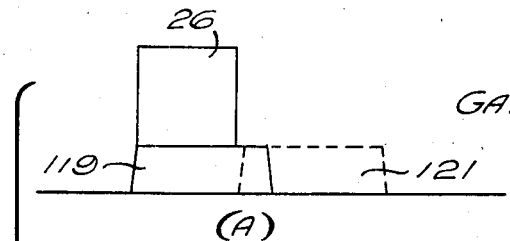
(A)
GATES OCCURRING TOO LATE
*Fig. 6*
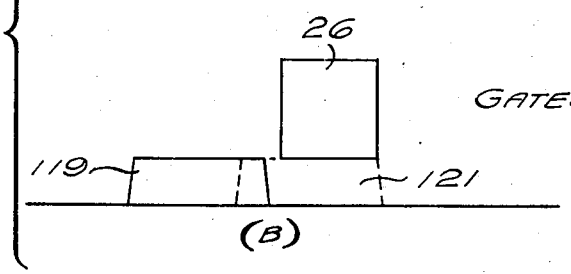
(B)
GATES OCCURRING TOO EARLY
INVENTOR.
BY Clifford M. Hammel
Kenway & Witter
Attys

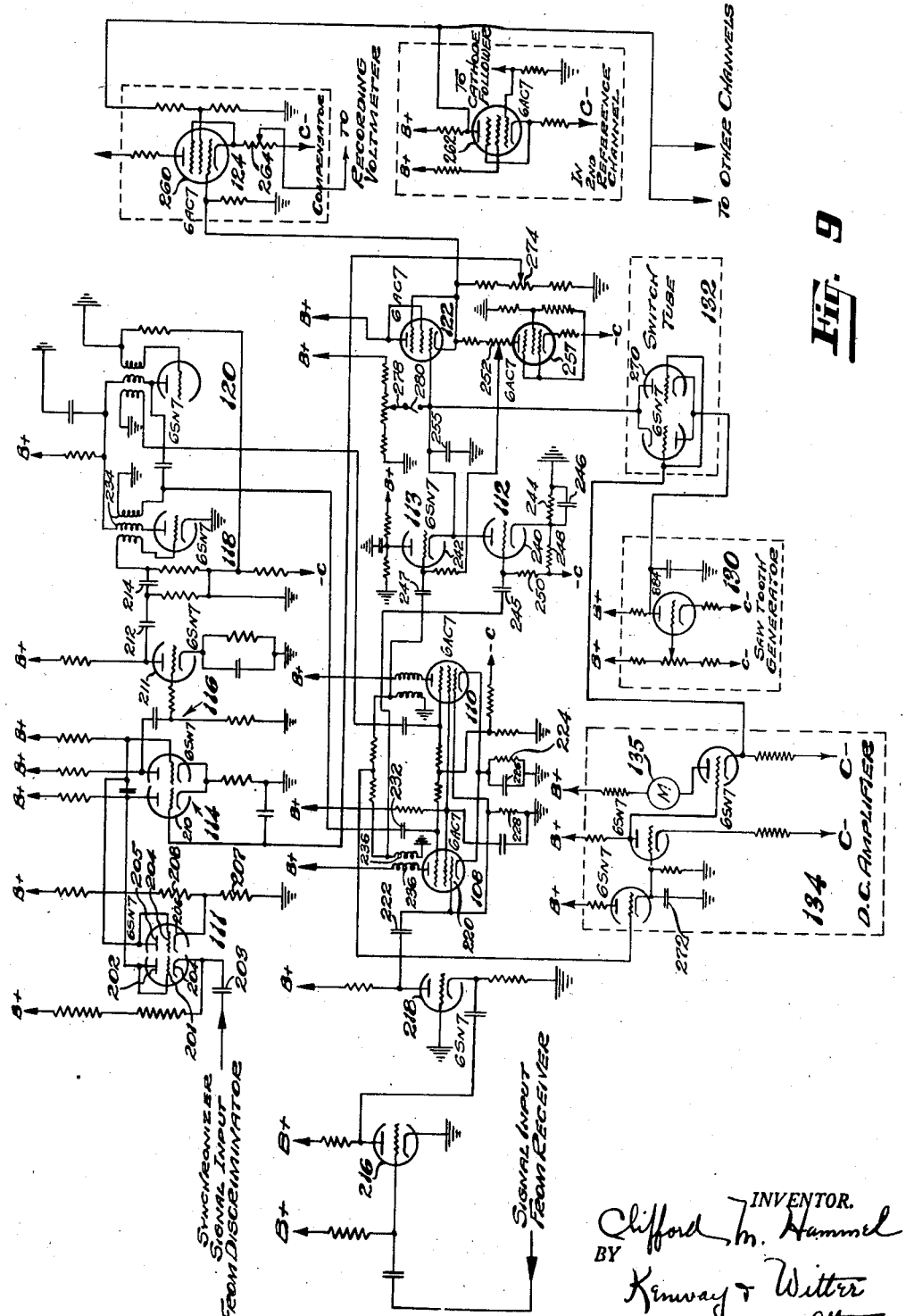

Patented Apr. 26, 1949

2,468,703

UNITED STATES PATENT OFFICE 2,468,703

CHRONOMETRIC ELECTRONIC RADIO-SONDE SYSTEM

Clifford M. Hammel, Winchester, Mass., assignor to Serdex, Inc., Boston, Mass., a corporation of Massachusetts Application September 26, 1946, Serial No. 699,373

10 Claims. (Cl. 177—351)

My invention relates to meteorology and in particular to radiosonde apparatus. In one aspect my invention comprises a new system for the measurement of meteorological variables and the transmission and recording of the measurements.

For many years valuable meteorological information has been collected from balloons provided with radio transmitters and associated electro-mechanical equipment for broadcasting signals responsive to changes in meteorological conditions including pressure, temperature and relative humidity. One form of apparatus has generally been constructed and arranged to transmit a reference signal followed by three intelligence signals which are in turn followed by a second reference signal, thus forming a five element cycle which is repeated every four or five seconds. Each ground station is provided with a receiver and mechanical means for printing marks on a slowly moving sheet of scaled paper in such a way that the linear distance between the mark representing the reference signal and the marks representing the intelligence signals are functions of values of pressure, temperature and humidity. Several difficulties have been encountered in the construction and operation of radiosonde equipment of this chronometric character. For example, the voltage output of the battery used to power the airborne equipment is subject to diminution during the period of flight with consequent change in the speed of the timing mechanism. Furthermore the wide changes in temperature and pressure encountered during the ascent effect changes in the rate at which the cycles are performed. Consequently, it has been found most difficult to synchronize the receiving and recording apparatus on the ground with the transmitting apparatus suspended from the balloon. Moreover, the ground station is seriously thrown off when interfering signals are received at or near the frequency of the balloon transmitter.

The most important object of my invention is to improve the accuracy and efficiency with which meteorological information may be gathered at various altitudes and transmitted to the ground for recording.

Another object of the invention is to provide apparatus for continuously and simultaneously transmitting and recording measurements of pressure, temperature and humidity.

An important feature of the invention consists in providing electronic means for continuously transmitting and recording meteorological information in contrast to the discontinuous electro-mechanical systems now in use in which several seconds necessarily elapse between corresponding points in consecutive cycles of operation.

Still another feature of the invention consists in a combination of elements by means of which the ground station is made to react only to signals transmitted from the balloon, all extraneous signals being barred, and by means of which circuits responsive to the intelligence signals are automatically synchronized.

Another feature of the invention resides in providing at the ground station separate circuits for recording values of pressure, temperature and humidity, which are so arranged that there can be no overlapping. That is to say, the pressure circuit, for example, will never react to anything but pressure signals and not be effected by temperature or humidity signals or by the reference signals.

Still another feature of the invention resides in means for employing the synchronizing reference signal in conjunction with an automatic radio direction finder.

These and other objects and features of the invention will be more readily understood and appreciated from the following detailed description of a preferred embodiment thereof selected for purposes of illustration and shown in the accompanying drawings, in which:

Fig. 1 is a diagram illustrating by a succession of curves the pulses transmitted by the airborne equipment during one cycle, together with curves showing the composition and origin of the transmitted pulses, Fig. 2 is a diagram similar to that shown in Fig. 1 but illustrating the treatment by the ground station apparatus of the received pulses, Fig. 3 is a block diagram of the units comprising the airborne equipment, Fig. 4 is a block diagram of the units comprising the ground station equipment.

Fig. 5 is a diagram of the pulses from the early and late gate circuits showing a signal pulse properly located with respect to the gate pulses.

Fig. 6 is a diagram similar to that shown in Fig. 5 but showing signal pulses in their relation to offset early and late gate pulses, Fig. 9 is a circuit diagram of one channel at the ground station.

Before proceeding to a detailed description of the elements comprising my invention, I shall first discuss briefly the general organization thereof. In the airborne equipment I include four delay type multivibrator units triggered by a relaxation oscillator which also locks them in proper synchronization. The first delay multivibrator is utilized to transmit a pulse for time reference purposes, the delay being relatively short so that it will follow closely the pulse originated by the relaxation oscillator. The other three delay multivibrators are controlled partly by the relaxation oscillator and partly by elements responsive to temperature, humidity and pressure. The output pulses of the four delay multivibrators are fed through differentiating circuits which produce short pulses corresponding to the trailing edges of the broader pulses produced by the multivibrators. The pulses from the differentiating circuits and from the relaxation oscillator are amplified and used to key a radio frequency oscillator connected to an antenna.

The ground station equipment includes a receiver tuned to the frequency of the balloon transmitter and connected through a discriminator to an automatic radio direction finder system. Only the reference pulses are fed to the direction finder. The ground station equipment also includes four separate channels, each of which receives the first reference signal and one intelligence signal. Each of the channels terminates in a recording voltmeter which records a voltage made to correspond to the elapsed time between the first reference signal and the particular intelligence signal received by that channel.

Functions of airborne unit

Figure 1:
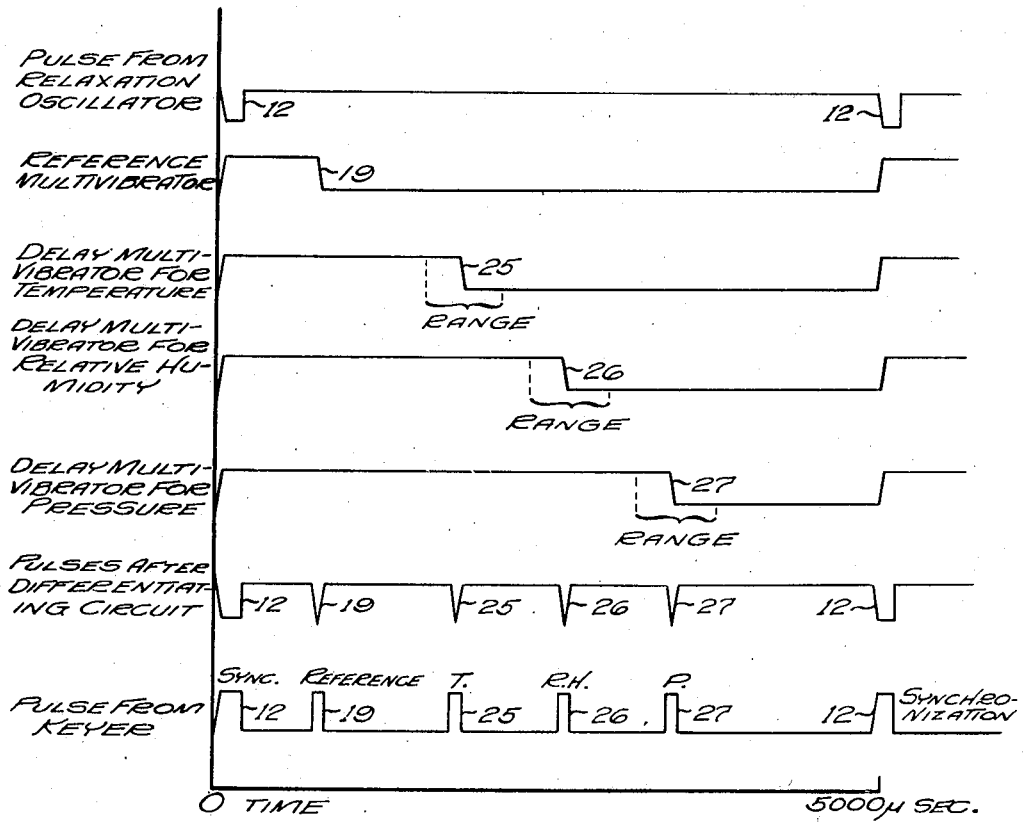
Figure 3:
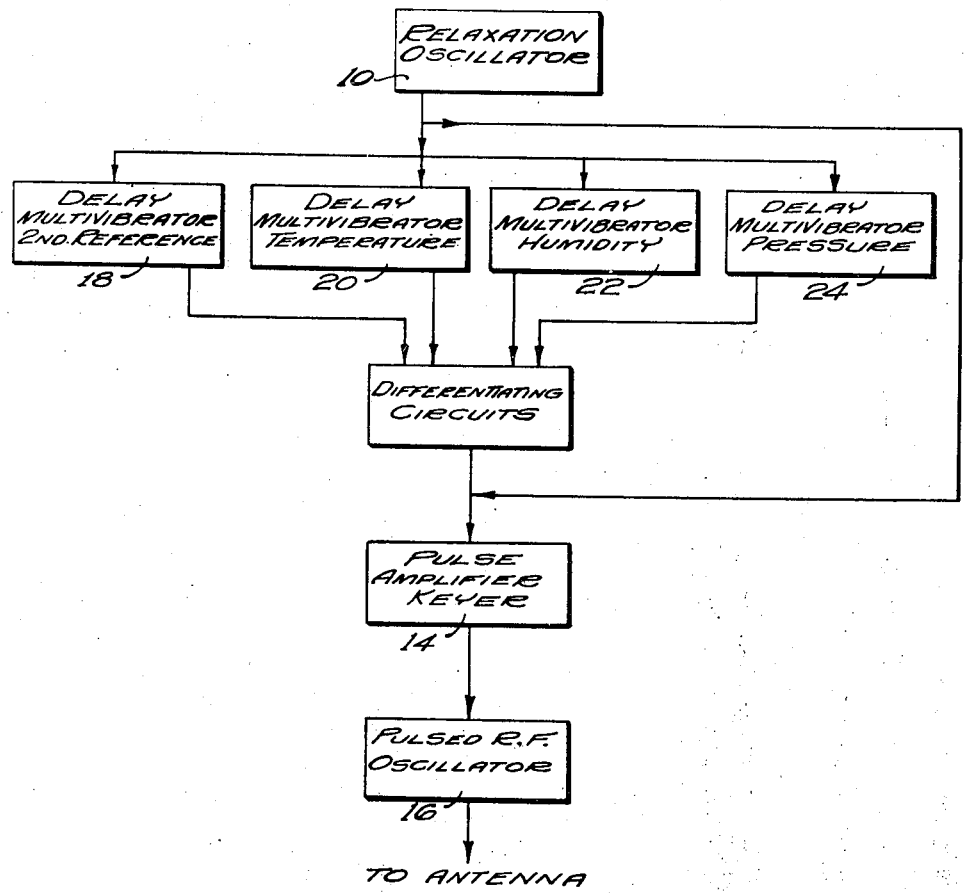
Figure 7:
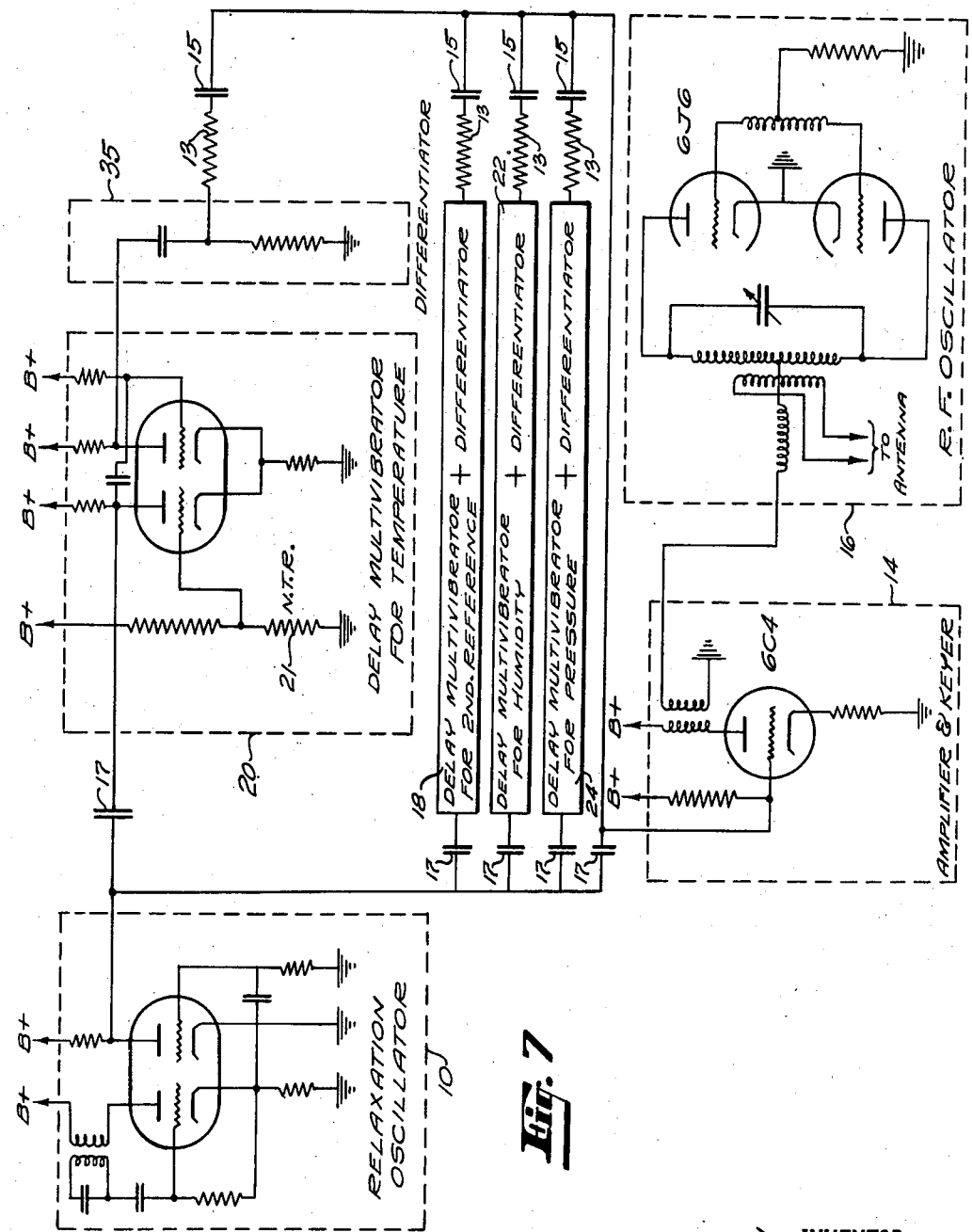
Fig. 7 is a circuit diagram showing the airborne unit.

I shall now discuss the airborne equipment in terms of its functions and with reference to Figs. 1 and 3. The block diagram of Fig. 3 shows the elements in the airborne unit and their functional relationship, while the diagram of Fig. 1 shows the various pulses produced and transmitted. Fig. 7 shows one form of circuit suitable for the airborne equipment and will be discussed later.

The first element is a relaxation oscillator 10, obtaining power from a suitable battery (not shown), carried by the balloon and arranged to deliver a short negative pulse at fixed intervals. I have found that a frequency of 200 cycles per second conveniently adapts itself to the conditions encountered. The relaxation oscillator 10 is therefore constructed to deliver a pulse every 5000 microseconds, the pulse lasting for about 2 microseconds.

The output of the oscillator 10 is represented in the curves of Fig. 1 by the negative pulse 12 and is sent directly to a pulse amplifier and keyer 14 which feeds a radio frequency oscillator 16 connected to the balloon antenna.

The output of the oscillator 10 is also fed to four delay multivibrators 18, 20, 22 and 24. The delay multivibrator is a pulse generating circuit which is set in action by an exciting trigger potential derived from an external source. Once the delay multivibrator has been triggered, it will produce a rectangular pulse of a width (time) determined by the circuit constants. The delay multivibrator 18 is constructed with fixed constants and extinguishes after a predetermined interval with respect to the triggering pulse. The second curve of Fig. 1 illustrates the positive pulse 19 produced by the reference delay multivibrator 18.

The delay multivibrator 20 is similar to the reference multivibrator 18 except that it includes a negative temperature coefficient resistor 21 which varies in its resistance as a function of the ambient temperature and controls the period of the duration of the pulse 25 produced by the delay multivibrator 20 but only through a predetermined range.

Similarly, the delay multivibrator 22 is connected to a resistor strip and to a contact moved across the strip by a humidity responsive element such as a confined diaphragm of goldbreater's skin (not shown) so that its pulse width 26 or period of delay is responsive to humidity. Likewise a pressure capsule of conventional structure (not shown) is also arranged to vary the position of a contact or a resistor strip included in the circuit of the multivibrator 24 to control the width of its pulse 27.

The positive pulse output of each of the delay multivibrators is passed through a differentiating circuit which produces a negative pulse measuring the rate of change in the output of the multivibrators. Since the rate of change along the trailing edge of each pulse from the multivibrators is far greater than any change preceding or following the trailing edge, the result is a single, peaked, negative pulse as shown in Fig. 1 and lasting about 1 microsecond. The same reference characters are used to designate the pulses throughout the description of the system in order to make it easier to follow what happens.

After the pulses pass through the differentiating circuits, they are fed to the amplifier and keyer 14, and then to the RF oscillator 16. The last curve of Fig. 1 shows the five pulses comprising the complete cycle; the fixed frequency synchronizing and reference pulses 12 and 19; and the intelligence pulses or signals 25, 26 and 27. The latter pulses may vary in position (time) of the cycle, but the constants for the delay multivibrators 20, 22 and 24 are so selected that the ranges of delay cannot overlap. That is to say, as set up in the drawings the sequence of synchronizing pulse, reference pulse, temperature pulse, humidity pulse, and pressure pulse, is unvarying. Obviously the exact sequence used is a matter of choice.

It is to be understood that the resistors included in the delay multivibrator circuits 20, 22 and 24 and responsive in value to movements of the elements sensitive to temperature, humidity and pressure are so selected that the variations possible in each case produce an effective range for each of the three multivibrators. These ranges are indicated in Fig. 1; as before stated the circuit constants are such that the ranges cannot overlap, but it is evident that as the ambient temperature changes, for example, the trailing edge of the pulse 25 will move back and forth within the range indicated on the drawing. That is to say, each position of the trailing edge of the pulse 25 within its range corresponds to a temperature value, and the elapsed time between the pulse 12 and the trailing edge of the pulse 25 is the measure of temperature. The same considerations apply to the pulses 26 and 27 referring to humidity and pressure values. To obtain a satisfactory circuit the design of the unit must be such that the synchronizing pulse 12 is at least twice as wide, or twice as long in duration, as the width of the intelligence pulses. For example, the pulse 12 may be two microseconds in duration and the pulses corresponding to the trailing edges of the multivibrator pulses should then be in the order of one microsecond in duration. The relative values appear in the last two curves of Fig. 1, although it must be understood that this figure is not drawn to scale.

Circuit of the airborne unit

I have treated the airborne unit from the functional standpoint, and skilled electronic engineers will readily appreciate that any one of a number of different circuits could be used to obtain comparable results. For example, there are many kinds of relaxation oscillators which could be employed to trigger the delay multivibrators. I have, however, designed a circuit for the airborne unit, which is the best form known to me for carrying out my invention. This circuit is shown in Fig. 7 which will now be discussed in detail.

The relaxation oscillator 10 comprises a blocking oscillator constructed according to well-known principles and per se forms no part of my invention. For a thorough discussion of the factors involved in constructing an oscillator of the type required for the airborne unit, the reader is referred to an article appearing in "Radio News" for September 1946, volume 36, No. 3, beginning on page 14. As explained previously, the pulse from the oscillator 10 should be twice as wide as the differentiated pulses from the delay multivibrators, and the aforesaid article includes all the information necessary to construct an oscillator so characterized.

The delay multivibrators 18, 20, 22 and 24 are all identical except for the provision of variable resistors in the last three. Here again the circuit itself does not form part of my invention, and the reader is referred to "Theory and Applications of Electron Tubes," by Herbert J. Reich, published in 1944 by the McGraw-Hill Book Co., Inc. On page 360 of this book a circuit is shown which could be used in place of the one shown in Fig. 7 and which differs from the circuit of the multivibrator 20 only in the fact that the latter is condenser coupled between the plate of the first triode and the grid of the second, whereas the circuit in the book employs resistance coupling. As shown in Fig. 7 the output of the multivibrator 20 is fed through a differentiating circuit 35 which comprises a condenser and resistor connected in series from the plate of the second triode of the multivibrator 20 to ground, the output from the differentiator being taken from between the condenser and the resistor. The operation of the differentiator circuit 35 is well explained on page 357 of Reich's book above referred to.

The amplifier and keyer is less conventional and will, therefore, be described in some detail. It comprises essentially a triode, for example, a 6C4, and the output from the differentiator circuits is combined with the output from the oscillator 10 and fed to its control grid. The control grid is connected to B+ through a bias resistor so that the tube is normally in a conducting state. When the negative pulses from the differentiator circuits and the relaxation oscillator 10 reach the control grid, each pulse momentarily biases the tube beyond cut-off. Consequently a positive pulse appears on the plate of the 6C4 every time a negative pulse is received on the grid. The output of the keyer and amplifier 14 is inductively coupled to the plates of a double triode, such as a 6J6, included in the RF oscillator 16. The latter is a conventional tuned plate push-pull oscillator wherein the only source of plate voltage is the pulses received from the keyer 14. The result is that the 6J6 tube will oscillate only upon the receipt of positive pulses in the plate circuit. Those skilled in the art will readily appreciate that the frequency allotted for radiosonde work will necessarily have a modifying influence on the circuit of the RF oscillator.

It will be observed that coupling condensers 17 are inserted in the line from the relaxation oscillator 10 to the multivibrator circuits 18, 20, 22 and 24. Their function is conventional. Similarly, coupling condensers 15 are inserted in the lines from the differentiator circuits to the amplifier and keyer 14; the coupling condensers 15 are preceded by series connected isolating resistors 13. Again, the functions of the coupling condensers 15 and the isolating resistors 13 are conventional.

Functions of the ground station

Figure 2:
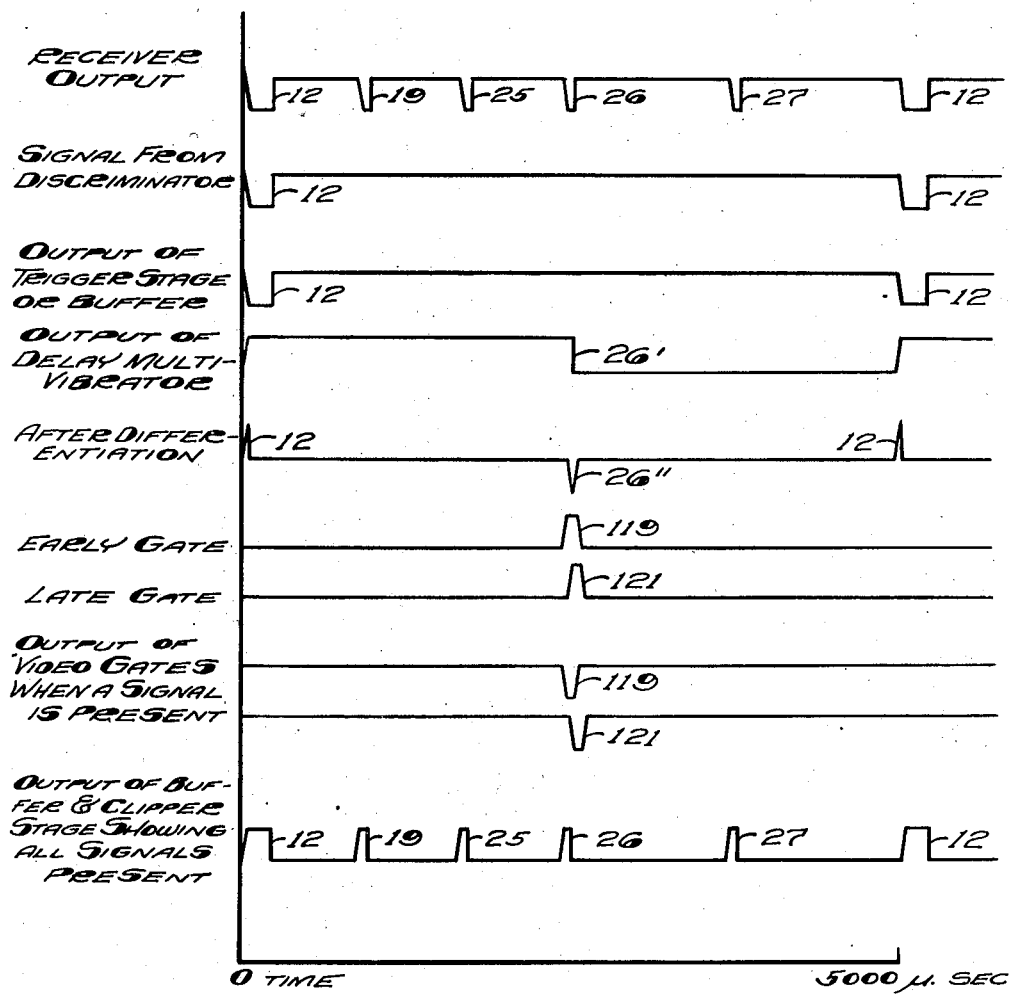

Broadly speaking the ground station comprises equipment for receiving the pulses sent from the balloon and recording the time differentials between the reference pulse 12 and the intelligence pulses 25, 26 and 27 in terms of voltage so that recording voltmeters may be calibrated in terms of the meteorological variables being measured. The first element in the ground station equipment is a high frequency receiver 100 connected to an antenna and tuned to receive the signals sent from the RF oscillator 16 in the airborne unit. As shown in Fig. 2 the receiver pulse output corresponds to the output of the oscillator 16 as shown in the last line of Fig. 1 except that the pulses are negative.

There are four channels, or distinct circuits, in which the received pulses are treated and converted as will later appear, and the output of the receiver is fed directly into the input tube of each of the four channels. There is also provided a discriminator 102 into which the output of the receiver 100 is fed. The discriminator eliminates all of the pulses except the two microsecond pulses 12, originating in the relaxation oscillator 10, which are then fed into a radio direction finder system 104. The latter forms no part of the present invention, per se, but is preferably constructed according to well-known principles and is automatic in operation. The radio direction finder system operates to indicate the azimuth and elevation angle of the balloon in flight. While the circuit for the radio direction finder system, as stated above, is not a part of the present invention, it is very definitely an important feature of my invention to operate the direction finder solely by the synchronizing pulses 12 sent out from the balloon. By operating the radio direction finder with pulses sent at a fixed frequency, and by barring from the direction finder all other signals, the direction finder is made to perform its functions much more efficiently than would be possible by operating it on heterogeneous pulses of random frequency. It may happen that an extraneous signal will coincide with the pulse 12, but statistically the likelihood of such an event is extremely small; furthermore no harm would be done if a pulse 12 did occasionally coincide with the extraneous signal, since following pulses 12 would immediately rectify any error.

The output of the discriminator 102 is also fed to each of the four channels.

Figure 4:
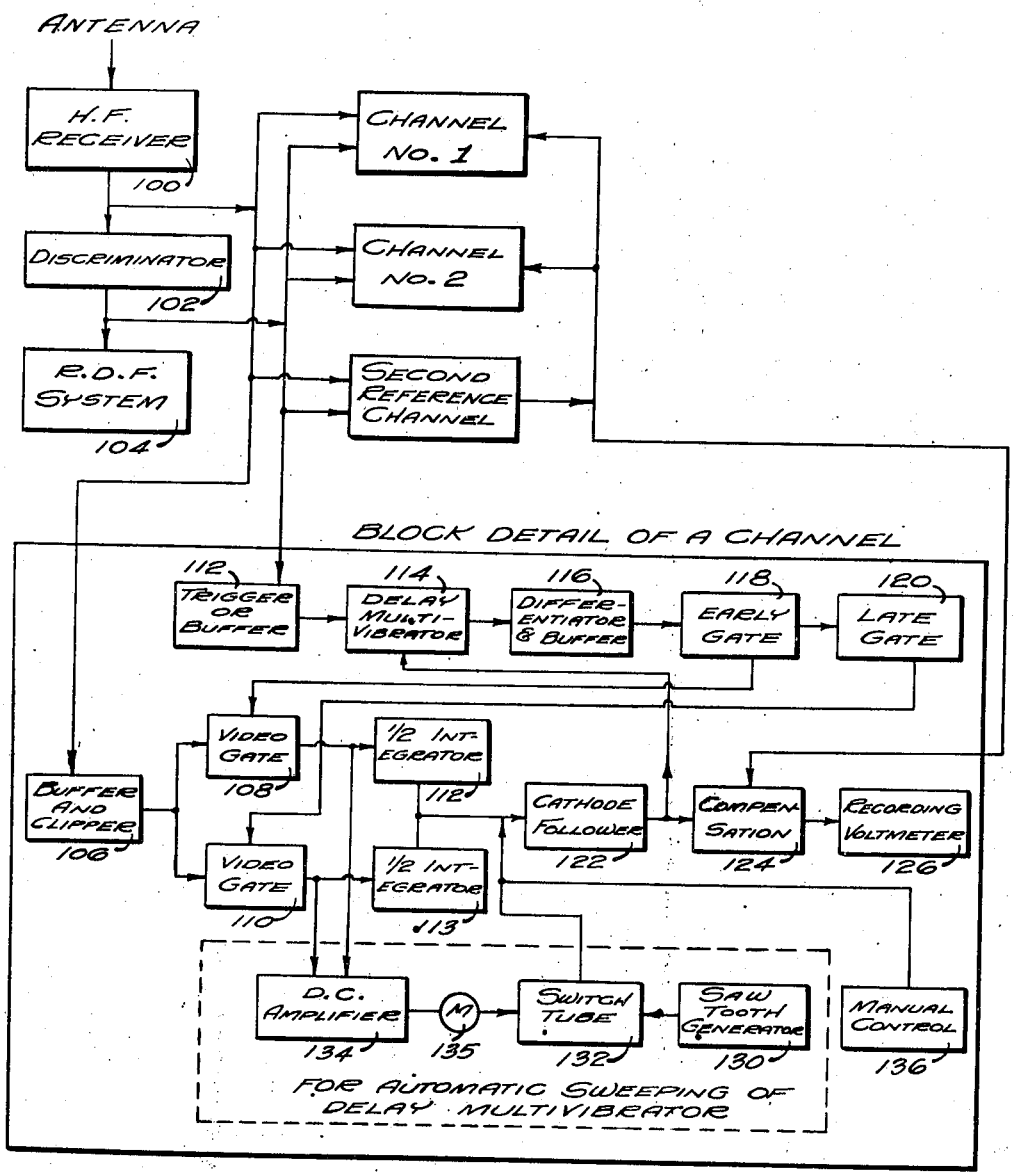

I provide channels for the treatment of the second reference pulse 19, for the temperature pulse 25, for the humidity pulse 26 and for the pressure pulse 27. The block diagram of Fig. 4 shows the functional relationship of the elements of the ground station and a detail of the units comprising the channel for the humidity pulse 26. It is to be understood that the other channels are substantially identical.

The output of the receiver 100 is fed to a buffer and clipper circuit 106 which isolates the receiver from the elements following the buffer and clipper and which also limits all of the pulses to a predetermined value as represented by the last line of Fig. 2. The output of the buffer and clipper 106 is then fed to a pair of video gate circuits 108 and 110. The video gate circuits are in effect amplifiers which function only when exciting voltage is applied from two external sources at the same time and are otherwise biased beyond cut off by a suitable negative voltage on the suppressor grid. That is to say, the output from the buffer and clipper 106 is not sufficient in itself to actuate either of the video gate circuits.

The output of the discriminator 102 is fed, in each channel, to a buffer circuit 112 which isolates the channel from the discriminator and which amplifies the pulses 12 coming from the discriminator 102 and feeds them as trigger pulses to a delay multivibrator 114 having circuit constants selected to give a delay period corresponding to one of the delay multivibrators 20, 22 or 24 of the airborne unit; for example, the delay multivibrator 114 may be set to correspond to the period of the delay multivibrator 22 of the airborne unit, considering that the channel shown in detail is that used to treat the pulse 26 corresponding to humidity. The output of the delay multivibrator 114 is fed to a differentiating and buffer circuit 116.

The differentiator 116 differentiates the pulse from the delay multivibrator 114 which appears in Fig. 2 as the pulse 26', since it corresponds to the pulse 26 from the multivibrator 22, and converts it into a sharply peaked negative pulse 26'' corresponding to the trailing edge of the pulse from the delay multivibrator 114. The output from the differentiator is fed through the buffer into an early gate 118 comprising a trigger circuit which will fire only when excited from an external source such as the output of the differentiator 116. The early gate pulse 119 is fed into a late gate circuit 120, also a trigger circuit arranged to fire only when triggered from an external source such as the early gate circuit 118. The circuit constants of the gate circuits 118 and 120 are so selected that the early gate pulse 119 triggers the late gate circuit 120 in time to produce an overlapping pulse 121. The overlapping of the early gate pulse 119 and the late gate pulse 121 is shown diagrammatically in Figs. 5 and 6.

The pulse 119 from the early gate 118 is also fed into the video gate circuit 108, and the pulse 121 from the late gate circuit 120 is fed into the video gate circuit 110. As before stated, the video gate circuits 108 and 110 are so constructed that they will not conduct unless excited by two external coinciding signals, one comprising the pulse from the buffer and clipper 106 and the other from the early and late gate circuits 118 and 120. While the buffer and clipper feeds into the video gate circuits all of the pulses from the receiver 100, the video gate circuits only conduct when a pulse from the buffer and clipper coincides with early and late gate pulses from the circuits 118 and 120. The latter pulses are obtained from the delay multivibrator 114 which, as previously stated, is designed to give a pulse 26' coinciding with the pulse 26 from the humidity delay multivibrator circuit 22 in the airborne unit. Consequently the video gate circuits 108 and 110 and the units which follow them are in effect actuated only by humidity pulses 26. The video gate circuit 108 leads to an integrator circuit 112 and the gate circuit 110 leads to an integrator circuit 113. The combined output from the integrator circuits 112 and 113 is fed into a cathode follower amplifier 122. The arrangement of the cathode follower amplifier 122 and the integrator circuits 112 and 113 is such that the D. C. voltage output from the cathode follower 122 swings one way or the other in response to the character of the output of the integrator circuits. The integrator circuit 112 influences the voltage output in the negative direction, and the integrator circuit 113 influences the voltage output positively. Figs. 5 and 6 illustrate the three possible relative positions of the humidity pulse 26 from the buffer and clipper 106 in relation to the pulses from the early and late gate circuits 118 and 120. If the pulse 26 rides evenly on the pulses 119 and 121, the integrator circuits 112 and 113 will respond evenly and three will be no change in the voltage applied to the input of the cathode follower 122. If the humidity signal pulse 26 shifts its position so that it rides more on the early gate pulse 119 than on the late gate pulse 121, the integrator circuit 112 and the video gate 108 will deliver negative voltage to the cathode follower 122 while the video gate 110 and the integrator 113 will supply to the cathode follower 122 a positive voltage corresponding only in proportion to the pulse 121. Consequenly the cathode follower 122 will swing more negative. Conversely if the pulse 26 shifts so that it rides more on the late gate pulse 121 than on the early gate pulse 119, the video gate 110 and the integrator 113 will swing the cathode follower 122 in the positive direction. The output of the cathode follower 122 is fed back to the delay multivibrator 114 where it is applied as a bias voltage to vary the delay period of the multivibrator. When the signal pulse 26 occurs early and rides on the early gate 119, the cathode follower 122 will apply to the delay multivibrator 114 a bias tending to shorten the delay period. As a result the trigger pulse to the early and late gate circuits from the delay multivibrator 114 will be made to occur a little earlier and both gate pulses 119 and 121 will be shifted to the left with respect to the graph shown in Figs. 5 and 6, and the result will be to move them until the pulse 26 rides evenly spaced with respect to the pulses from the early and late gate circuits. Similarly if the signal pulse 26 rides more on the late gate pulse 121, the video gate circuits with the integrator circuits and the cathode follower 122 will apply a biasing voltage to the delay multivibrator 114 tending to lengthen the delay period and shift the early and late gate pulses to the right with respect to Figs. 5 and 6 to again bring about a condition where the signal pulse 26 is evenly spaced with respect to the early and late gate pulses 119 and 121. This means that the trailing edge of the pulse from the delay multivibrator 114 occurs at the same time as the signal pulse 26 and will follow any change that the pulse 26 might make. Since the position of the delay multivibrator pulse is a function of the voltage from the cathode follower 122, it follows that this voltage is proportional then to relative humidity.

The output from the cathode follower appears as a direct current voltage and is fed through a voltage compensating circuit 124 to a recording voltmeter 126 which effectively measures the output of the cathode follower 122. The recording voltmeter 126 may be calibrated in terms of relative humidity and from the foregoing explanation it will appear that the recording voltmeter 126 is continuously supplied with a voltage proportional to relative humidity being measured continuously by the sensitive element in the balloon. Furthermore the value recorded by the voltmeter 126 is corrected 200 times every second.

Recognizing that the radical changes encountered in meteorological conditions as the balloon ascends may tend to introduce changes of rate and errors of measurement, I provide means for continuously compensating for the effect on the instrument of all changing conditions. That is done by utilizing the second reference pulse 19. It will be remembered that the second reference pulse is obtained from the delay multivibrator 18 carried by the balloon and triggered by the relaxation oscillator 10. The elements of the multivibrator circuit 18 are of fixed value, as opposed to the variable elements included in the intelligence multivibrators 20, 22 and 24. Hence the timing between the trigger pulse 12 and the second reference pulse 19 will remain at a constant value except as affected by extraneous conditions. Any change in the elapsed time between the pulse 12 and the pulse 19 will be the result of an error which equally affects the timing between the pulse 12 and all of the intelligence pulses 25, 26 and 27. It follows that if means is provided for changing the period between the pulse 12 and the pulse 26', for example, in the same amount as any change appearing between the pulses 12 and 19, a proper correction will have been inserted. That is the purpose of the second reference pulse and the second reference channel of the ground station equipment.

The second reference channel contains the same elements as are found in the intelligence channels, with the exception that no recording voltmeter is provided. The output from the cathode follower in the second reference channel is applied as bias on a tube in the compensator 124 which, therefore, adds algebraically to the output of the cathode follower 122 a correcting voltage component sufficient to modify the output from the cathode follower 122 by an amount exactly compensating for any change in the timing between the pulses 12 and 19. The result is that the recording voltmeter 126 records a corrected voltage. For example, if outside conditions should affect the equipment in the balloon in such a way as to shorten the delay periods of all the multivibrators, the second reference channel circuit would operate to insert a plus correction to the input of the recording voltmeter 126.

For calibration purposes and for setting the multivibrator 114 so that it will lock on the pulse 26, I provide apparatus for automatically causing the multivibrator 114 to sweep through its range of delay periods. In order to obtain the sweep effect, I provide a saw-tooth generator 130 which generates direct voltage varying in a sawtooth wave pattern and feeds through a switch tube 132 to the cathode follower 122. The sawtooth D. C. voltage applied to the cathode follower 122 causes the delay multivibrator 114 to produce pulses of periods covering its full range. During its sweep there will inevitably come a time when the delay multivibrator emits a triggering pulse 26' which causes the early and late gate circuits 118 and 120 to apply pulses to the video gate circuits 108 and 110 which latter pulses 119 and 121 will coincide with a humidity pulse 26 received from the buffer and clipper circuit 106. It is again to be understood, however, that the range through which the delay multivibrator sweeps is not wide enough to include any of the other pulses coming from the buffer and clipper 106. When the pulses from the early and late gate circuits do coincide with a pulse 26 from the buffer and clipper, the video gates will conduct, as before, to the intergrators 112 and 113 and also to the D. C. amplifier 134. The output from the video gates 108 and 110 is amplified by the D. C. amplifier 134 and applied to the switch tube 132 as a bias voltage sufficiently great to cut off the switch tube. From then on the saw-tooth generator 130 is effectively cut out of the circuit and the signal pulses 26 take over and determine the timing of the delay multivibrator 114 in the manner previously stated. The combination of the saw-tooth generator 130, the switch tube 132 and the D. C. amplifier 134 provides fully automatic sweeping of the delay multivibrator 114. However, I contemplate the provision, as an alternative, of a manual control device 136 by means of which the delay period of the multivibrator 114 may be varied until it locks on a signal from the buffer and clipper. A voltmeter 135 in the line between the amplifier 134 and the switch tube 132 will indicate when that condition has been obtained, and the pulse 26 from the buffer and clipper circuit 106 will again take over and determine the period of the delay multivibrator 114.

It is to be remembered that the delay multivibrator 114 is in each instance triggered by the pulse 12 fed from the receiver 100 through the discriminator 102 and through the trigger circuit 112. When I speak of sweeping the delay period of the multivibrator 114, it is to be understood that the initiation of the pulses 26' of the multivibrator 114 is in each case obtained from the buffer circuit 112, and the action of the discriminator 102 is to supply to the buffer circuit 112 only the pulses 12 originating in the relaxation oscillator 10 in the airborne unit.

*The circuit of the ground station equipment*

Figure 8:
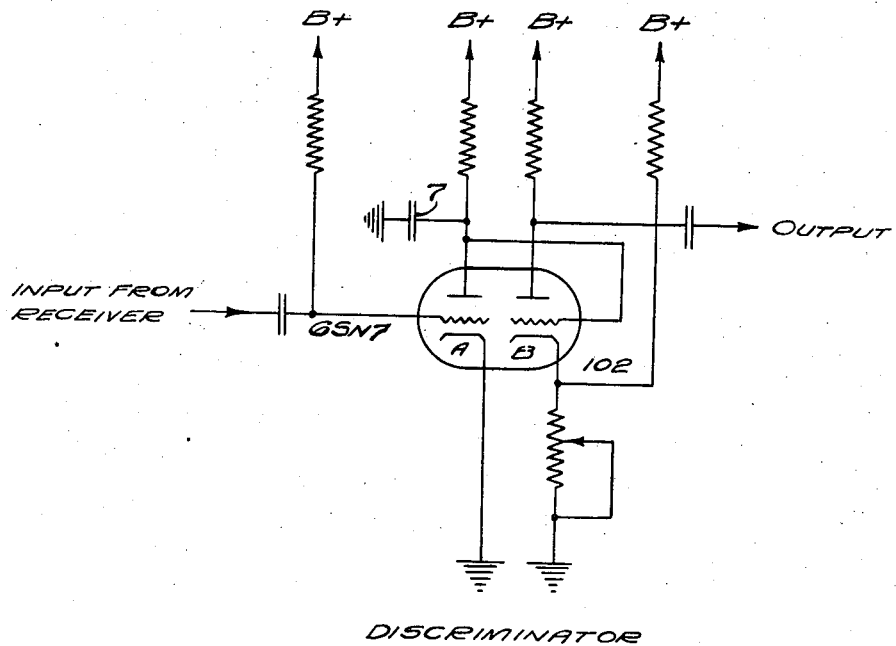
Fig. 8 is a circuit diagram of the discriminator at the ground station.

The ground station unit has been discussed from the functional standpoint without specific reference to the elements of the various circuits contained therein. As in the case of the airborne unit, it will be understood that there are many possible circuits which could be employed with comparable results, but I have designed a circuit for the ground station unit, which is the best form known to me for carrying out my invention. This circuit is shown in Figs. 8 and 9 and will now be discussed in detail.

As before stated, the high-frequency receiver 100 may be of conventional design; any communications type receiver capable of covering the frequencies used may be employed, provided it does not introduce time lags in the signals received.

The discriminator 102 is organized about a double triode, such as, for example 6SN7. The operation of the circuit is as follows. The first half A of the tube is normally in the conducting state. The negative pulses from the receiver are applied to a grid of the tube A and cut it off for a length of time corresponding to the width of the pulse. During the time the tube is cut off the plate condenser 7 charges to a value depending upon the RC time constant of the condenser and plate resistor but responsive also to the duration of the pulse on the grid. The cathode bias on section B of the double triode is so chosen that section B will not conduct unless the condenser 7 has been charged to a value representing a function of a 2 microsecond pulse on the grid of the tube A; tube B will not conduct when a 1 microsecond pulse has charged the condenser 7. It is to be understood that the plate condenser 7 of the first half A of the double triode applies a positive potential on the grid of the second half B, and that it is only when a 2 microsecond pulse has been applied to the grid of the half A that the charge on the plate condenser will rise to a value sufficient to impress the grid of the half B with a positive bias sufficient to cause the tube B to conduct. The result is that the output from the half B of the triode will correspond to the 2 microsecond synchronizing pulses 12, but it will not respond to any of the other pulses received from the receiver 100. This condition is represented by the second line in Fig. 2 in which all the pulses except the pulse 12 have been blanked out.

As previously stated the output from the discriminator 102 is fed to a buffer 112 comprising the first half of a double triode 200, such as a 6SN7. The grid 201 of the first half of the triode 200 is connected to the plate 202 with the result that the tube functions as a diode. The input from the discriminator circuit 102 is fed through a coupling condenser 203 to the cathode 204, and the cathode is connected to B+ through a pair of series connected resistors. The second half of the triode 200 is utilized as a limiting circuit. Again the grid 204 is connected to the plate 205 so that the second half of the triode 200 also functions as a diode. The cathode 206 is connected to ground through a resistor 207 and connected to B+ through two series connected resistors 208 and 209. The resistors 207, 208 and 209 comprise a voltage divider from which cathode voltage is obtained. The delay multivibrator 114 is organized about a double triode 210 and will not be described in detail since it is identical with the circut used for the delay multivibrator in the airborne unit previously discussed. The grid of the second half of the multivibrator tube 210 is connected to the plate 205 of the limiting triode 200 with the result that the function of the limiter is to prevent changes in amplitude or width of the trigger pulse from the buffer from affecting the period of the delay multivibrator.

The output from the delay multivibrator 114 is fed through a differentiating circuit 116 which, again, is identical with the differentiator utilized in the airborne unit. The output pulse 26" of the differentiator 116 is fed to the grid of a buffer tube 211, comprising a conventionally connected triode which serves both as a buffer and as an amplifier. The plate of the buffer tube 211 is connected to a condenser 212 which is connected in series with a resistor 213 to form a pulse sharpening differentiating circuit. The output of the differentiating circuit is taken from between the condenser 212 and the resistor 213 and fed through a blocking condenser 214 into the early gate circuit 118.

The early gate circuit 118 comprises a triode connected with elements forming a blocking oscillator in which the grid and plate are inductively coupled and the circuit constants are so selected that there is no time constant for the oscillator. That is to say, it will fire once each time it receives a triggering pulse and otherwise does not conduct current. The output is in the form of a high amplitude, very narrow, square wave. The grid is biased negatively to below cut-off and blocks the tube until the sharp negative pulse 26" from the differentiator is applied to the grid.

The late gate circuit 120 is identical with the early gate circuit 118 with the exception that it is triggered by the pulse from the early gate and therefore emits a pulse 119 very slightly later than the early gate pulse 118.

As before stated the signals from the receiver are all applied to a buffer and clipper 106. (Only the synchronizing pulse 12 reaches the buffer 112 and progresses through the circuit to the early and late gate circuits 118 and 120.) The buffer comprises a triode 216 having its grid coupled through a condenser to the receiver output. The clipper comprises another triode 218 (or half of a double triode) having its cathode coupled to the plate of the buffer triode 216 through a blocking condenser, its grid being grounded to limit the output of the tube so that signals fed through the tube are levelled to a predetermined extent.

Since video gate circuits 108 and 110 are identical, only the circuit 108 will be described in detail. This circuit is organized about a pentode 220, for example a 6AG7, the grid of which is coupled through a condenser 222 to the plate of the clipper tube, while the cathode is grounded through a bias resistor 224 shunted by condenser 226. When a pulse hits the grid, the condenser 226 supplies current to the bias resistor 224 in order to prevent distortion of the pulse form. The grid is grounded through a bias resistor 228, and the screen grid is grounded through a condenser 230 to eliminate extraneous oscillations and parasitics. The screen receives voltage from B+. The suppressor grid of the pentode is inductively coupled to the plate of the early gate triode through a condenser 232 and a transformer 234. A transformer 236 is included in the plate circuit of the pentode 220 to provide coupling between the video gate circuit 108 and the integrator 112. The suppressor grid is connected to C— through a resistance network to provide a fixed negative voltage on the suppressor for preventing the flow of plate current when a pulse reaches the control grid. The result is that the pentode 220 will conduct only when a pulse 26 on the control grid coincides with a pulse 119 on the suppressor grid. Both pulses are, of course, positive.

The video gate circuits are identical, as before stated, the gate 108 being connected to the early gate 118 and the video gate 110 to the late gate 120.

The next unit comprises the integrating circuits 112 and 113, including a pair of triodes, 240 and 242. The grid of the triode 240 is connected through a condenser 245 to the output of the video gate circuit 108, and the plate is tied to the cathode of the triode 242. The cathode of the triode 240 is grounded through a bias resistor 244 shunted by a condenser 246, and the cathode is connected to C— through a voltage divider 248. Grid bias is obtained from C— through a resistor 250. The plate of the triode 242 is connected to B+ across a voltage dividing network to provide stable plate voltage. The grid of the triode 242 is connected through a condenser 247 to the output of the video gate 110 and to a balance control potentiometer 252 later to be discussed.

Pulses from the video gates are stored on the condensers 245 and 247. The triodes 240 and 242 are normally closely balanced, and a constant D. C. voltage is taken off the cathode of the triode 242 and the plate of the triode 240. This output is applied to a large condenser 255 grounded on one side. If pulses reach the condensers 245 and 247 in the form shown in Fig. 5, that is to say, equal pulse potentials are developed on the two grids, the balance is maintained and the output voltage does not change. If the signal pulse 26 rides more on the early gate pulse 119 than on the late gate pulse 121, the integrated pulse potential from the condenser 245 on the grid of the triode 240 will be greater than the potential developed on the grid of the triode 242. Consequently the charge on the condenser 255 decreases because the triode 240 will be passing more current than the triode 242. Conversely if the signal 26 rides more on the late gate pulse 121 than on the early gate pulse 119, the charge on the condenser 255 will be increased. Thus the D. C. output of the integrator circuits 112 and 113 is made to respond to the relative position of the signal pulse 26 in the cycle of pulses emitted from the airborne unit.

The combined output of the integrator circuits is fed to a conventional cathode follower amplifier 122.

To maintain balance of the triodes 240 and 242 I provide a constant current pentode 257 conventionally connected and including in its plate circuit the potentiometer 252. One end of the potentiometer 252 is connected to the cathode of the amplifier 122 to prevent unbalance of the integrator triodes resulting from shifts occurring in the period of the delay multivibrator 114 and consequent changes in the output from the integrator circuits.

The output from the cathode follower 122 is taken through a potentiometer 274 and applied back on the first grid of the delay multivibrator 114. As previously stated the trailing edge of the pulse of the delay multivibrator 114 determines the position of the early and late gate pulses. As the cathode follower responds to a change in the relative position of the humidity pulse 26 and the gate pulses 119 and 121, the portion of the output voltage which is applied back on the multivibrator 114 serves to change the delay period of the latter and shift the gate pulses 119 and 121 until they are properly spaced with respect to the humidity pulses 26.

The output from the cathode follower 122 is also taken from the cathode to the compensator 124 and impressed on the control grid of a pentode 260 on the screen grid of which is impressed a voltage received from an inverter tube 262 connected to the output of the cathode follower of the second reference channel circuit. A voltage divider is inserted before the screen grid of the tube 260 to reduce the voltage from the tube 262 to proper limits. As the period of the delay multivibrator of the second reference channel is varied by changes in the time between the pulse 12 and the pulse 19, a voltage proportional to the change appears on the screen grid of the tube 260. If the time between the pulses 12 and 19 shortens, the voltage on the screen swings more positive, and the output voltage from the cathode of the pentode 260 rises. The reverse occurs if the time between pulses increases. A potentiometer 264 is included in the cathode circuit of the tube 260, for calibrating purposes, the movable contact being connected to the recording voltmeter 126.

It will be understood that the control grid of the tube 262 in the second reference channel is connected to the cathode of a cathode follower amplifier in the circuit of the second reference channel and that the plate of the tube 262 feeds compensating voltage to the two other intelligence channel circuits in the same manner as it feeds the screen grid of the tube 260.

It is necessary to provide means for sweeping the delay multivibrator 114 through its range of delay periods, when the equipment is started, so that the trailing edge of the multivibrator pulse will be fed through the early and late gate circuits 118 and 120 and made to coincide with the appearance of a humidity pulse 26 reaching the video gate circuits. For this purpose I provide a saw-tooth wave generator 130 comprising a triode connected as explained on page 740 of "Radio Engineering," by F. E. Terman, 2nd edition, published in 1937 by McGraw-Hill Book Company. The generator 130 feeds through a double triode 270 connected back-to-back as a switch tube, the cathode of each half of the double triode being connected to the plate of the other half, and then to the grid of the cathode follower 122. A D. C. amplifier 134 is connected to the combined output of the video gate circuits 108 and 110. The amplifier 134 is conventional except for a large capacity cathode condenser 272 which smooths out the pulses received from the video gate circuits. The amplifier output is applied to the grids of the tube 270, and the connections are such that when signals pass through the video gates, they are amplified and applied as D. C. voltage on the grids of the tube 270, the amplified voltage being sufficient to bias the tube 270 below cut off. Hence the flow from the saw-tooth generator 130 is cut off.

When signals do not reach the amplifier 134, the switch tube 132 feeds the saw-tooth output to the cathode follower amplifier 122. The output of the latter is taken through a potentiometer 274, connected in a voltage divider network from the cathode of the amplifier tube 122 to ground, and applied to the delay multivibrator 114. The setting of the potentiometer 274 in conjunction with a grid condenser 276 in the multivibrator circuit 114 determines the range of delay periods. Therefore the saw-tooth waves from the amplifier 122 vary the voltage on the potentiometer 274 and sweep the multivibrator 114 across its range of delay periods, each pulse originating, as before, from the trigger pulse from the buffer 111.

When trigger pulses from the early and late gates 118 and 120 coincide at the video gate circuits 108 and 110 with a humidity pulse 26 from the buffer and clipper 106, the video gates conduct current and feed the amplifier 134 which cuts off the switch tube 132. Thereafter the pulses 26 take control of the delay multivibrator 114 in the manner above described. A milliammeter 135 is connected in the plate circuit of the last tube in the D. C. amplifier 134. When the meter reading is low, the switch tube is cut off; when the meter reads high, the switch tube lets the saw-tooth voltage from the saw-tooth generator 130 control the delay multivibrator 114.

The circuit including the D. C. amplifier 134, the saw-tooth generator 130, and the switch tube 132 provides for automatic sweeping of the delay multivibrator 114. For manual control of the multivibrator, I provide a potentiometer 278 connected across a voltage dividing network from B+ to ground and to the cathode of the amplifier 122; a switch 280 is included in the line from the potentiometer 278 to provide for disconnecting it when the humidity pulses 26 have been synchronized with the early and late gate circuit pulses. The voltage through the potentiometer 278 is applied to affect the delay period of the multivibrator 114 in the same manner as the output of the saw-tooth generator 130.

Those skilled in the art will readily appreciate the necessity of providing appropriate test and calibrating equipment such as voltmeters, ammeter, oscilloscopes, etc. With their use the circuits may be readily adjusted and calibrated.

Having thus disclosed my invention, what I claim as new and desire to secure by Letters Patent of the United States is:

1. Meteorological apparatus comprising a transmitter arranged to emit fixed frequency reference signals and intelligence signals interposed in varying positions between each pair of reference signals, a receiver for said signals, a discriminator connected to said receiver and arranged to pass only the reference signals, a delay multivibrator connected to the output of the discriminator, early and late gate circuits connected to the output of said multivibrator, a clipper and buffer circuit connected to the output of the receiver, a pair of video gate circuits connected to the early and late gate circuits and to the buffer and clipper circuit, integrator circuits connected to said video gate circuits, a cathode follower amplifier connected to the output of the integrator circuits and connected to the delay multivibrator, a voltage compensator circuit also connected to said cathode follower output, and a recording voltmeter connected to the output of said compensator.

2. Meteorological apparatus, comprising a delay multivibrator, an oscillator connected to trigger said multivibrator at fixed intervals, an element sensitive to a meteorological condition, means connected to said element and to said multivibrator for controlling the delay period in response to said condition, means for transmitting one signal when said multivibrator is triggered and a second signal when said delay period ends, means for receiving both signals, and means for measuring and recording the time between the two signals.

3. Apparatus of the class described comprising a receiver, a pair of video gate circuits fed from said receiver, a discriminator connected to said receiver and arranged to pass only pulses above a predetermined width, a delay multivibrator triggered from said disciminator, early and late gate circuits connected to said delay multivibrator and to said video gate circuits, integrating circuits connected to said video gate circuits, and a voltmeter connected to said integrators.

4. Apparatus of the class described as in claim 3 wherein a cathode follower amplifier is connected between said integrators and said voltmeter.

5. Apparatus of the class described comprising a radio transmitter, a first delay multivibrator feeding said transmitter, an oscillator producing fixed frequency pulses triggering said delay multivibrator and feeding said transmitter, means responsive to a meteorological condition for controlling the period of said delay multivibrator, a receiver, a second delay multivibrator constructed to have a period equal to that of the first delay multivibrator, means connected to said receiver for feeding to the second multivibrator only the pulses transmitted directly from the oscillator, early and late gate circuits triggered by said second multivibrator, a pair of video gate circuits connected respectively to said early and late gate circuits, each of said video gate circuits being also fed from the receiver and so arranged as to pass current only when pulses from the early and late gate circuits coincide with pulses from said receiver and transmitted from said first delay multivibrator, integrator circuits fed by said video gate circuits, a cathode follower amplifier fed jointly by said integrator circuits, a voltmeter connected to measure the output from the amplifier, and means connected to said cathode follower amplifier and said second delay multivibrator for controlling the period of the latter in response to the relative position of the pulse from the first multivibrator with respect to the pulses from the early and the late gate circuits.

6. Apparatus of the class described comprising means for transmitting a pair of timed reference pulses at a fixed rate, means for transmitting between pairs of reference pulses a plurality of intelligence pulses each of which is timed relative to the reference pulses by an amount responsive to a meteorological condition, a receiver for all of the pulses, means responsive only to one of said reference pulses for producing a closely adjacent pair of gate pulses at intervals corresponding closely to the intervals between successive repetitions of a selected one of said intelligence pulses, means for recording a voltage, and means for applying to said recorder a voltage only when said pair of gate pulses coincides with said selected intelligence pulse.

7. The apparatus described in claim 6 with the addition of means responsive to variations in time elapsing between successive reference pulses and effective to vary the timing of the gate pulses in order to automatically synchronize the selected intelligence pulse and said gate pulses.

8. Apparatus of the class described comprising a first buffer circuit, a delay multivibrator fed from said first buffer circuit, a differentiating circuit fed by said delay multivibrator, a pair of pulse-producing circuits, one of said pulse-producing circuits being triggered by said differentiating circuit and the second pulse-producing circuit being fed by the first, a pair of gate circuits each of which is fed by one of said pulse-producing circuits, a second buffer circuit feeding both of said gate circuits, integrator circuits each of which is fed by one of the gate circuits, and amplifier fed jointly by said integrators and feeding said multivibrator to control its delay period, and a voltmeter fed from said amplifier.

9. Apparatus of the class described comprising means for transmitting a pair of timed reference pulses at a fixed rate, means for transmitting between pairs of reference pulses a plurality of intelligence pulses each of which is timed relative to the reference pulses by an amount responsive to a meteorological condition, a receiver for all of the pulses, means responsive only to one of said reference pulses for producing a closely adjacent pair of gate pulses at intervals corresponding closely to the intervals between successive repetitions of a selected one of said intelligence pulses, means for recording a voltage, means for applying to said recorder a voltage only when said pair of gate pulses coincides with said selected intelligence pulse, and means responsive to shifts in time between said reference pulses for introducing a compensating voltage on said recorder.

10. Apparatus of the class described comprising means for transmitting a pair of timed reference pulses at a fixed rate, means for transmitting between pairs of reference pulses a plurality of intelligence pulses each of which is timed relative to the reference pulses by an amount responsive to a meteorological condition, a receiver for all of the pulses, means responsive only to one of said reference pulses for producing a closely adjacent pair of gate pulses at intervals corresponding closely to the intervals between successive repetitions of a selected one of said intelligence pulses, means for recording a voltage, means for applying to said recorder a voltage only when said pair of gate pulses coincides with said selected intelligence pulse, and means for compensating said recorder by an amount representing a function of any departure from the fixed time at which said reference pulses are transmitted.

CLIFFORD M. HAMMEL.

REFERENCES CITED

The following references are of record in the file of this patent:

UNITED STATES PATENTS

| Number | Name | Date |
| --- | --- | --- |
| 2,027,367 | Blair | Jan. 14, 1936 |
| 2,216,161 | Curtiss | Oct. 1, 1940 |
| 2,381,009 | Siderman | Aug. 7, 1945 |
| 2,395,467 | Deloraine | Feb. 26, 1946 |
| 2,402,973 | Moore | July 2, 1946 |
| 2,403,210 | Butement | July 2, 1946 |
| 2,403,890 | Johnson | July 9, 1946 |